D. G. LITTLEFIELD.
Magazine Stove.
No. 2,612. Reissued May 14, 1867.
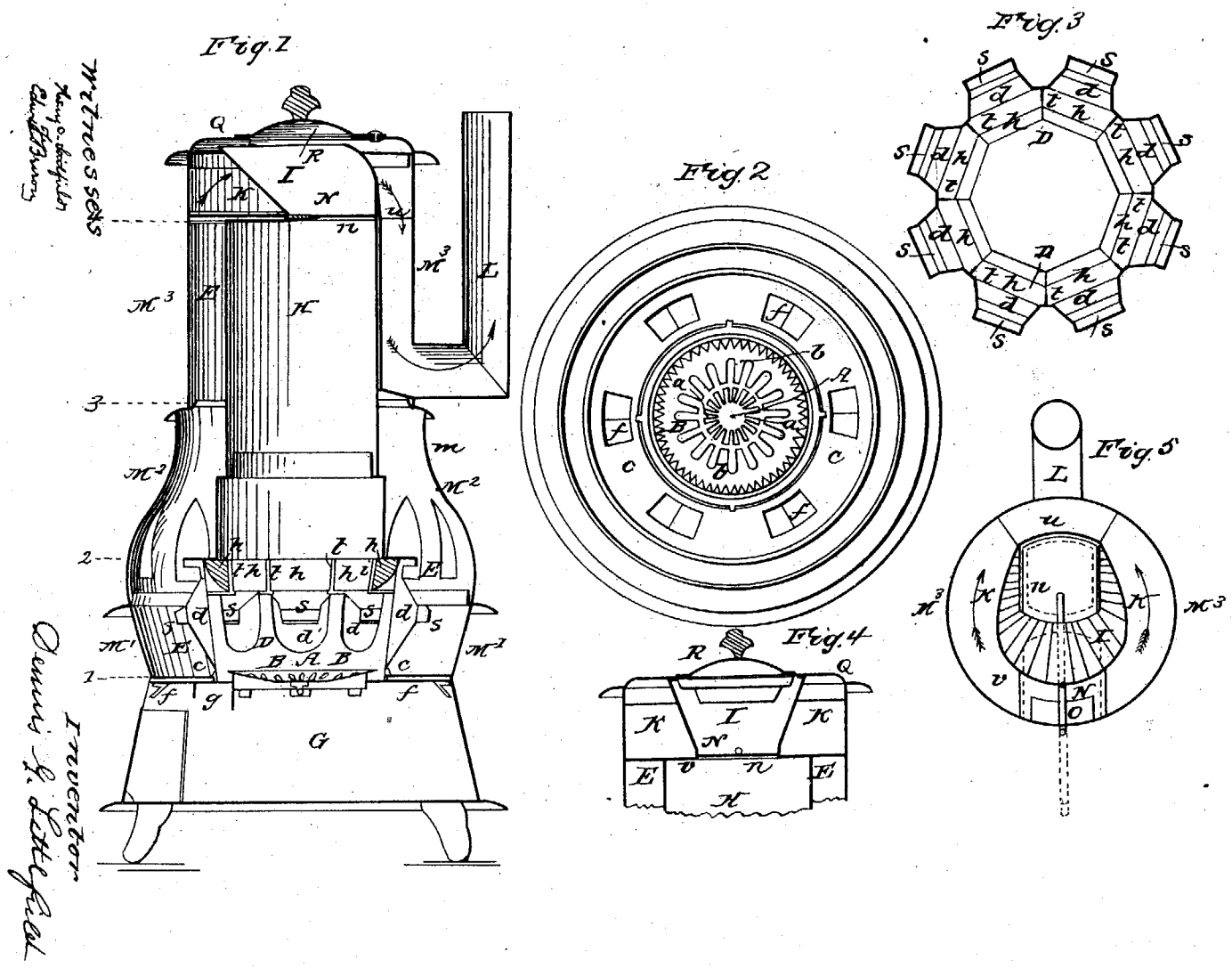
N. PETERS. Photo-Lithographer, Washington, D. C.

United States Patent Office.

DENNIS G. LITTLEFIELD, OF ALBANY, NEW YORK.

*Letters Patent No.* 37,103, *dated December* 9, 1862; *antedated November* 26, 1862; *reissue No.* 2,612, *dated May* 14, 1867.

BASE-BURNING STOVE.

The Schedule referred to in these Letters Patent and making part of the same.

TO ALL WHOM IT MAY CONCERN:

Be it known that I, DENNIS G. LITTLEFIELD, of the city of Albany, and State of New York, have invented certain new and useful improvements in a well-known class of stoves, which I denominate Magazine Coal-Burners; and I do hereby declare the following to be a full and exact description of the same, reference being had to the annexed drawings, making a part of this specification, in which—

Figure 1 is a vertical section central from front to back of a burner comprising my invention.

Figure 2 is a transverse section at line 1 of fig. 1, showing the annular floor *f f* of the hollow space E E E, enclosed by the outer case M M, fig. 1, and also what I call the mill-grate B A B.

Figure 3 is a transverse section of the part of the burner between line 1 and line 2 of fig. 1, where combustion takes place, and which I call the furnace, directly over which is placed what I call the fuel-magazine H, fig. 1.

Figure 4 is a vertical section, central from side to side of the upper part of the burner, showing more distinctly its structure.

Figure 5 presents an open view of the part of the burner above line 4, fig. 1, showing its internal structure.

The object of my invention is so to construct these invaluable burners as to bring into more effective operation certain principles of dynamics and esthetics conducive to their design, and thereby the more perfectly to adapt them to their purposes; and I now proceed to point out their defects and imperfections, and to describe the devices by which I propose to remedy them. Those who are familiar with my further inventions made since the date of my patent of 1862, of which this is a reissue, will not fail to see in the inventions intended to be secured by that patent, as herein more fully and exactly described, the origin and beginning of the series of original inventions which culminated in "The Morning Glory of 1866." The effective elements which characterize this class of burners consist of, first, the apparatus for burning coal, which, as already stated, I denominate the furnace; secondly, the fuel-magazine; and, thirdly, the surrounding hollow space through which the heat generated by combustion, circulates, and from the surfaces of which it radiates to produce the desired warmth.

First. The air-supplying grate at the bottom of the furnace ought to be so constructed as to allow the removal therefrom of the slate and other incombustible substances which accumulate therein, without extinguishing the fire.

Second. When, as in the burner shown in the drawings, the furnace is surrounded by the same chamber which receives the heated products of combustion therefrom, more direct and enlarged radiation from the burning coal would be highly beneficial by increasing the heating power, and by the more equal diffusion of heat through the surrounding chamber.

Third. To the same end, and that more heat may be communicated to all parts of the surrounding chamber, the outer case requires to be so constructed as to become more intensely heated, both by the direct radiation from the furnace, and from the hot products of combustion proceeding therefrom, and diffusing themselves over the interior surface of the case.

Fourth. For the double purpose of securing a better outer illumination, and a more beneficial diffusion of the heat radiating from the outer surface of the case, it is important to give to it such a form and so to dispose the windows that the light may be reflected upward, as well, to a sufficient extent, horizontally, and that a portion of the heat should be reflected downward.

Fifth. Coal-burners of this class, when in operation, generate and retain in their fuel-magazine highly inflammable mixtures, varying in quantity according to the quality of the coal and to the proportion of moisture it contains; and the sudden intermixture of these gases with atmospheric air will cause explosions. Hence it becomes important, when the magazine is to be opened for the purpose of replenishing it, first to free it from such gases.

Sixth. The burner should be so constructed that when in operation no atmospheric air can enter the fuel-magazine; and to this end some provision is indispensable for carrying off, through the exit flue, any air that may find entrance at the top of the burner.

Seventh. The burner should be so constructed that the hot products of combustion emitted from the furnace shall have room for immediate expansion; that they shall be retained at the point of expansion long enough to part with a large share of their heat; and that they shall then pass upward into a gradually contracting part of the chamber; because, by this means, they will be made to impart an increased and more uniform degree of heat to the transmitting case.

Eighth. For the purpose of giving to the burner the highest degree of efficiency, and of saving fuel, it should be so constructed that the hot products of combustion will be forced into full contact with all parts of the surrounding case throughout its whole extent, including its front and its extreme upper and rear portions, and then be turned downward to the exit flue.

Ninth. When to be used for warming the apartment in which it is placed, the burner should be so constructed as to transmit the largest share of its heat from the front, and a portion of it towards the floor of the apartment.

Tenth. When to be used for the last-mentioned purpose, the burner should be so constructed that bits of coal accidentally dropped upon the floor, or any refuse matter, may be readily and conveniently got rid of by depositing them in the magazine; and for this purpose should be provided with a sliding cover over the magazine, upon which, on opening the outer cover, such bits of coal or refuse matter may be thrown, and, after replacing the outer cover, be projected into the magazine by simply drawing the sliding cover.

I proceed next to specify and describe more particularly the devices by which I propose to accomplish the useful purposes I have enumerated.

Figure 1 of the accompanying drawings represents the burner from base to apex, inclusive. The base contains the ash-pit G, with one or more doors having register openings to regulate the admission of air to support combustion, and may also, at pleasure, be furnished with an ash-pan. My purpose in contracting the diameter or the base gradually upward is to facilitate the enlargement of the outer case opposite to the furnace; the great utility of which will be pointed out in the sequel. At line 1, fig. 1, the furnace D rests upon and is supported by an annular plate, *f f*. This plate is held in place by brackets projecting under it from the inner sides of the plates forming the ash-pit. The plate *f f* has resting upon it plate *c c*, encircling the bottom of the furnace, and having openings through it corresponding with openings in the plate *f f*, and being movable by a lever inserted in a socket, *g*, therein. The two plates together form a register, whereby a passage may, at pleasure, be opened from the ash-pit to the chamber E E E. This register is subservient to three purposes: to carry off, by means of the draught upward through it when opened, the floating dust while shaking down the ashes and slag from the furnace; to cool the burner, when overheated, by the admission of a current of cold air into the chambers E E E, the doors of the ash-pit being in the mean time open; and to let out the ashes carried into this chamber by the current through the grate at the bottom of the furnace, and deposited on the register, which, as it will be seen, forms the floor of the chamber. The mill-grat B A B, fig. 1, is constructed as follows: It consists of two parts. Its central part A is fixed, and has bars *a a* projecting from its periphery, as shown in fig. 2. Outside of this part there is a movable annular grate, B B, having a reciprocating movement around it. Projecting from the inner periphery of this grate, towards and nearly to the projecting bars *a a* above described, there are similar bars *b b*. This outer grate is rotated by means of a lever inserted in the usual manner, by which process slate and other incombustible matter is broken into small pieces between the bars *b b* and the bars *a a*, and falling through the grate is thus eliminated from the furnace without emptying it. The whole grate combined, however, is or may be made to tilt in the usual manner, It is made, in a greater or less degree, concave, in order that the incombustible matter may, in the process of grinding, move towards the centre. If thought advisable, the outer periphery of the grate B A B may also be denticulated-notched, as shown in fig. 2. The lower part of the furnace is so shaped as to form mouths or combustion outlets *d d* around its whole periphery, flaring outward from the bottom upward, as shown in figs. 1 and 3, instead of side perforations heretofore used in several well-known stoves of this class, in which the furnace is surrounded by the same chamber which receives the products of combustion evolved from the burning fuel. The number of these outlets varies according to the size of the furnace. Over and partially within them are placed bars *h h*, fig. 3, of soapstone or other suitable material, directly upon which rests the fuel-magazine H, fig. 1. These bars are severally held in place by thin plates *t t*, forming a part of the iron casting or otherwise affixed to it, and project upward between the ends of the bars, as shown in fig. 1, so that the bars are severally removable for repairs without injury to the rest. These bars forming a bridge, as it were, across the outlets, and running in direct line from point to point, tend to enlarge the outlets and to increase the radiation upward from the burning fuel to the chamber E E E, while at the same time they serve to contract the outlet from the magazine H, as shown in fig. 1, and by affording a partial support to the reserve coal, to prevent it from pressing too heavily upon the coal at the point where the most active combustion is intended to take place, which, being thus left free from undue compression, radiates an intense heat upward and outward. The outer sloping sides of the combustion outlets are lined with soapstone or fire-brick, either at the top only, as shown in the drawings, or entirely from top to bottom, as may be preferred. They may also, for greater durability, be lined on the sides, and even the whole interior may be lined throughout with soapstone, fire-brick, or other slowly-conducting material. The direction given to these outlets being such as to permit the radiation of heat to the upper portions of the chamber E E E, while the surface radiation is to the lower part of the chamber, the action of the heat evolved is rendered more effective, and a highly beneficial result, otherwise unattainable by means of such enclosed furnaces, is obtained. The magazine H may be cylindrical, as shown in the drawing, and should rise to such height as to give to it the requisite capacity, if replenished morning and evening, or twice, at nearly equal intervals, in twenty-four hours, to insure a uniform, uninterrupted, and sufficient supply of fuel, already heated, (as it must be in any burner,) in its gradual descent to the place of combustion. The burner is covered at the top by the plate Q, fig. 1, having a large central opening closed by the cover R. The top of the magazine H is covered by the plate *v*, which forms the floor of the chamber I, fig. 4. It extends beyond the margin of the magazine to the outer case, and thus becomes the floor also of the horizontal flue K formed by the extension upward of the exterior case, the walls of the chamber I, and the top plate Q in contact with them. This flue is connected with the chamber E E E by the aperture *o*, figs. 1 and 5, through the front part of the plate *v*, and passes on each side of the chamber I, from this aperture to the descending flue P, fig. 1. The flue P is connected with the plate *v*, and extends downward at least somewhat below the top of the magazine H, and there connects with the smoke pipe L, thus perfecting a continuous passage from the grate at the bottom of the furnace to the smoke pipe. The plate *v* has a large aperture, *n*, fig. 5, from the chamber I, through which coal is supplied to the magazine. It is closed by a sliding cover, N, fig. 5, and corresponding in width with the aperture *o*, closes it when drawn forward to open the aperture *n* to replenish the magazine, and thus shuts out the heated products of combustion from the flue K, and turns them back to find a new passage up through the magazine to the chamber I, and thence over the back wall of this chamber, cut down for the purpose, to the exit flue P, whence, the outer cover R, fig. 1, remaining in the mean time closed, they pass off without the danger of explosion. But although the primary object of this arrangement is to guard against puffs and explosions on opening the magazine, there are also other important advantages secured by it: First, the heated products of combustion are brought, by means of it, to the front of the burner on their passage to the flue K, instead of being carried, as they otherwise would be, in undue proportions in their direct passage from the chamber E E E to the rear, where heat is less needed, and its radiation would generally be impeded by proximity to a warm chimney or wall, and a portion of it consequently lost. This construction, it will therefore be seen, is conducive to a better diffusion of heat, and to an increase of its efficiency. Secondly, the gate-like cut-off or sliding cover N is highly conducive to convenience by affording an easy mode of conveying, from the chamber I to the magazine, whatever it is desirable so to dispose of, thus avoiding the necessity, otherwise unavoidable, of raising two covers to gain access to the magazine, or of opening a door and then lifting a cover to accomplish the same purpose. The outer case in its ascent above the line of its broadest expansion opposite to the furnace, it will be seen, (fig. 1,) deflects gradually inward, assuming a dome-like form until it reaches the point at *m*, and thence continues with a gradually diminishing diameter to its upper termination. The beneficial effect resulting from this form is threefold: first, by the inclination thus given to the case it is brought more nearly over the furnace, and the heat and light thrown obliquely therefrom strike more nearly at right angles upon the surface of the case, and consequently with greater force and effect than if the case rose perpendicularly; secondly, the broad extension of the lower part of the case affords ample room for the required expansion, and its immediate contraction secures the requisite detention (as already explained) of the hot products of combustion proceeding from the furnace; and, lastly, the whole structure is made to present itself to the eye under a graceful and beautiful form.

Those skilled in the art will, I trust, readily see the best modes of carrying my invention into practice, and I will now proceed to explain the management and operation of a stove such as I have described it.

Preparatory to kindling the fire the sliding cover N is to be drawn forward, as shown in fig. 5, for the purpose of giving exit to the smoke through the magazine H, and thereby preventing it from sullying the windows. After lighting the kindlings and leaving them to burn long enough for their smoke to pass off, the magazine H is to be filled with coal and the cover N returned to its place. As combustion proceeds all the coal up to a line just above the outlets *d d* becomes ignited. The products of imperfect combustion, as they accumulate in the magazine H, pass downward to the outlets, where they burn, and thereby aid in keeping up a vivid combustion at that point, while, by their close proximity to the incandescent coal upon the grate B A B, they help also to maintain combustion there, and having been thus utilized and spent, they pass to the enlarged part of the chamber E E E. Here all the hot products of combustion issuing from the furnace expand, and having, during their detention, expended a share of their heat and become contracted in volume, they pass thence up into the remaining space around the magazine, and to the front of the burner, and through the aperture *o* to the flue K, and thence along both sides of the chamber I, and in contact with the top plate Q, to the rear of the burner, thence turning downward to the flue P, fig. 1, they pass off through the smoke pipe L. As the process of combustion advances the power of the burner is gradually evolved in all its surpassing force, conducting, radiating, and reflecting heat from all its surfaces. From the flaring portion of the case $M^1$, the heat radiating in a direct line from its surface warms the floor of the room throughout a circle described by a line running from the upper extremity of the flaring surface at right angles with it to the floor. From the part of the surface next above to *m*, fig. 1, by the leaning position given to the windows surrounding the case at the line indicated by $M^2$, fig. 1, they are made to shed their light upward, and thus to illuminate the whole apartment.

What I claim as my invention, and desire to secure by Letters Patent, is—

1. The mill-grate B A B, constructed and operating substantially as and for the purpose herein described.

2. I also claim the flaring portion of the outer case $M^1$, in combination with the furnace D, substantially as and for the purposes described.

3. I also claim the furnace D, opening into and in combination with the chamber E E E, and so constructed as to emit both light and heat from the burning coal in an upward direction, substantially as and for the purposes set forth.

4. I also claim, in combination with the subject-matter of my third claim, the plates *f f* and *c c*, which form the floor of the chamber E E E, and a register opening from the ash-pit, substantially as and for the purposes set forth.

5. I also claim the compelling of the draught from the grate while the fire is kindling, and previous to and during the process of replenishing the magazine, to pass through the magazine for the purposes specified, by the means I have devissd, or by any other analogous devices.

6. I also claim the chamber I, communicating with the flue P, whereby air finding admission through the aperture over which rests the cover R, passes at once to the exit flue, as specified.

7. I also claim the divided flue K around the chamber I, and forming a communication between the chamber E E E and the flue P, whereby the products of combustion are drawn to the smoke pipe and chimney, and the heat rendered more effective by its proper diffusion within the burner, as herein set forth.

8. I also claim the plate *v*, forming the top of the magazine, and projecting out over it to the outer case, and having apertures, *o*, at the front side, and another *u*, into the flue P, as described, substantially as and for the purposes set forth.

9. I also claim such an adjustment of parts of the magazine stove as will carry the whole volume of the heated products of combustion to the front region of the stove, and thence to the rear part of it over the top of the magazine, in the manner I have described, or by any other analogous devices.

10. I also claim the gate-like sliding cover N, in combination with the magazine H, as and for the purpose herein set forth.

11. I also claim the inward deflection of the case $M^2$, in its relation to, and combination with, the furnace and chamber E E E, substantially as and for the purposes set forth.

12. I also claim the window openings in the outer case at $M^2$, in combination with the recession of the case, substantially as and for the purposes set forth.

DENNIS G. LITTLEFIELD.

Witnesses:

HENRY C. LITTLEFIELD,

EDM. F. BROWN.